United States Patent [19]
Martin et al.

[11] Patent Number: 5,384,636
[45] Date of Patent: Jan. 24, 1995

[54] EXTERNAL SCATTER REMOVAL SYSTEM

[75] Inventors: Graham J. Martin, Woodland Hills; Leo K. Lam, Calabasas; Thomas J. Hutchings, West Hills, all of Calif.

[73] Assignee: Litton Systems, Inc., Woodland Hills, Calif.

[21] Appl. No.: 629,108

[22] Filed: Dec. 12, 1990

[51] Int. Cl.⁶ .................. G01B 9/02; H01S 3/083
[52] U.S. Cl. ......................... 356/350; 372/94
[58] Field of Search .............. 356/350; 372/94

[56] References Cited

U.S. PATENT DOCUMENTS 4,449,824  5/1984  Matthews ..................... 356/350
4,818,087  4/1989  Dorschner .
4,923,299  5/1990  Anderson et al. ............. 356/350

OTHER PUBLICATIONS

A. Faraday Effect Optical Isolator; L. J. Aplet and J. W. Carson; Applied Optics, vol. 3, No. 4, Apr., 1964; pp. 544–545.
The Faraday Optical Isolator; G. Fischer; Journal of Optical Communications; 1987; pp. 18–21.
Optics; Eugene Hecht/Alfred Zajac; Addison–Wesley Series in Physics; Feb., 1979; pp. 261–263.
TGG Terbium Gallium Garnet; Litton Airtron Synoptics.

Primary Examiner—Stephen C. Buczinski
Attorney, Agent, or Firm—L. David Rish; James F. Kirk; C. E. Martine

[57] ABSTRACT

Disclosed herein is an External Scatter Removal System for Ring Laser Gyroscopes (such as a Split Gain Multioscillator) comprising a prism mounted on an optoisolator, wherein light transmitted out at least one of the mirrors of the Gyroscope passes into the prism and detector system, while oppositely directed backscattered light from the prism components is not returned to the gyroscope frame's internal optical path, thereby limiting any appreciable backscatter from interfering with an accurate measurement of the rotation rate of the gyroscope.

13 Claims, 6 Drawing Sheets

EXTERNAL SCATTER REMOVAL SYSTEM

BACKGROUND OF THE INVENTION

1. Field of the Invention

The present invention relates to ring laser gyroscopes including multioscillator ring laser gyroscopes, and more particularly, to a split-gain multioscillator ring laser gyroscope including a system for removal of external scatter by restricting the entry of externally scattered light back into the ring resonator cavity of the ring laser gyroscope.

2. Description of Related Art

Over the past twenty five years the gaseous medium planar ring laser gyroscope has been developed and evolved as a reliable and relatively environmentally insensitive inertial rotation sensor. Planar ring laser gyroscopes of both triangular and square geometries have been used in inertial navigation systems and flight control systems regularly in both commercial and military aircraft. The primary advantage of the ring laser gyroscope over the spinning-wheel mechanical gyroscope is its ability to be configured into a truly strapdown system. This provides a system that not only has a much larger dynamic range than the mechanical equivalent but also one free of mechanical bearings, greatly enhancing its ability to withstand relatively large mechanical shock without permanent degradation of its performance. Because of this and other features the expected mean time between failures of most ring laser gyroscope inertial navigation systems is several times longer than the mechanical gyroscopes they replace.

At low rotation rates, the retroscatter from the mirrors couples energy from one of the oscillating beams into the oppositely propagating beam which locks the oscillating frequencies together yielding zero rotation information at low rotation rates. Current operational ring laser gyroscopes having a planar configuration use mechanical dithering schemes to bias the rate sensor to avoid this will known lock-in phenomenon. Mechanical dither is very effective in reducing the effects of lock-in and makes the ring laser gyroscope a successful navigation-grade gyroscope. However the mechanical dither in such a ring laser gyroscope adds a quasi random noise component to the output and can seriously limit the performance unless additional costly techniques are implemented to minimize the effects of the dither. In addition there are some applications where the presence of either body or mirror dither cannot be tolerated such as with certain military requirements, with space borne applications and with systems needing fast updates of position.

With these limitations in mind alternative biasing techniques have been developed using a nonreciprocal Faraday effect created by the application of an axial magnetic field either directly to the gain medium or to a solid glass element placed within the ring laser cavity. The resulting differential phase shift produced between the counterpropagating beams separates their lasing frequencies and shifts the lock-in band to inputs rates higher than those of concern. An example of this technique applied in a so-called multioscillator configuration may be found in U.S. Pat. No. 4,818,087 entitled "ORTHOHEDRAL RING LASER GYRO" issued on Apr. 4th 1989 to Raytheon Corporation (Terry A. Dorschner, inventor). Modern multioscillator gyroscopes use a nonplanar light path to both force the lasing polarizations to be circularly polarized and to create a frequency difference, known as the reciprocal splitting, between the two types of circularly polarized light. In this manner the beam pairs of each polarization can operate without coupling with one another to create two laser gyroscopes operating in the same cavity. When a Faraday element is added, with a properly applied magnetic field, to the cavity the frequencies of the counterpropagating beam pairs for each gyro are split by an equal but opposite amount. Thus the difference of the output beats of the two gyros is substantially independent of the size of the nonreciprocal Faraday bias but is doubly sensitive to rotation. In such a device there are at least four lasing modes: a left-circularly polarized anticlockwise frequency ($L\underline{a}$), a left-circularly polarized clockwise frequency ($L\underline{c}$), a right-circularly polarized clockwise beam ($R\underline{c}$), and a right-circularly polarized anticlockwise beam ($R\underline{a}$). The nonreciprocal Faraday splitting between the clockwise and anticlockwise beams is typically of the order of 1 MHz. At least four mirrors form the ring resonator path, which encloses a cavity also containing an excited medium in order to provide the necessary gain for the four modes to lase as shown in FIG. 1A. One of the mirrors is semitransparent to allow light to leave the resonator and fall upon a photo detector for signal processing. Demodulator circuitry removes the Faraday bias carrier frequency and leave a beat signal doubly sensitive to rotation compared with the equivalently sized planar dithered RLG.

FIG 1B shows the arrangement of the gain curves 20a and 20b for an alternative form of a multioscillator-type ring laser gyroscope. The operation of this gyroscope is more fully described in the patent application entitled "*Split-Gain Multimode Ring Laser Gyroscope and Method*" Ser. No. 07/115,018, filed on Oct. 28th, 1987 (Graham Martin, inventor), and assigned to the same assignee of this application. Ser. No. 07/115,018 is currently under United States Patent Office Secrecy Order (Type One Order). A brief explanation of the split-gain gyroscope may be understood by reference to the gain curves 20a and 20b of FIG. 1B. The split-gain gyroscope operates across two longitudinal mode groups encompassing eight possible lasing modes. A uniform axial magnetic field is applied to the entire gain region in the cavity light path resulting in a splitting of the overall gain curve into two parts; one part 20a will provide gain for modes of one helicity only ($L\underline{a}$ and $R\underline{c}$) while the other part 20b will provide gain for the other helicity only ($L\underline{c}$ and $R\underline{a}$). If the magnetic field is tuned so that the splitting of the gain curve is substantially equal to the cavity free spectral range then by suitable minor adjustment of the cavity length the gain curves 20a and 20b can be positioned (as shown in FIG. 1B) so that only the $L\underline{a}$ and $R\underline{c}$ modes from the first longitudinal mode group laser while only the $L\underline{c}$ and $R\underline{a}$ modes from the next longitudinal modes group lase. The resulting lasing modes are the same as those found in the multioscillator configuration which uses a intracavity Faraday element but the split-gain light path has no intracavity elements and the equivalent Faraday nonreciprocal splitting has been increased from the previous typical value of around 1 MHz to a value equal to the cavity free spectral range. The latter value depends on the cavity length but is typically around 2 GHz.

All the above multioscillator ring laser gyroscope configurations are non-dithered alternatives to the dithered planar ring laser gyroscope or the mechanical gyroscope. The Split-Gain multioscillator has the distinct advantage over the Faraday biased multioscillator in that no intra-cavity element (a source of scatter and loss error) is required and the large splitting between the lasing modes ensures that conventional backscatter coupling is not present.

However the large mode separation of the split-gain configuration can create error sources in that the two component gyro beam pairs (the $L_a$ and $R_c$ modes may be one pair and the $L_c$ and $R_a$ are the other) are far enough away in frequency to give imperfect common mode rejection of some effects. Of concern for this disclosure are the effects caused by light, which has exited the cavity through an output mirror, being scattered back into the cavity in the same propagation direction it previously possessed but with a phase shift dependent on its path length outside the cavity. The main source for this type of retroreflection is scattering centers occurring in the path of the exiting light beam after the beam combining optic. The beamsplitter surface in the combining optic allows any backscattered light in the combined beam to be redirected back into the cavity in the forward direction. Such external scattering effects are present in all ring laser gyros whether they are of the planar dithered variety or of the multioscillator type. However in most cases the effects occur equally for the counterprogagating beams and are common-moded out in the gyro beat. This is very true for the two-mode dithered gyro where the counterpropagating beam frequencies are only separated by the effects of rotation and are generally always within 1 MHz of one another. In the Faraday multioscillator the counterpropagating beam frequencies are sometimes separated by up to several MHz by the Faraday-induced nonreciprocal splitting but the effects of the external scatter, although larger than in the dithered gyro, are still too small to cause problems for most applications. However the counterpropagating beam frequencies in the split-gain configuration are equivalently separated by the cavity reciprocal splitting which typically may be several hundred MHz. In this case the external scatter effects are evident as sinusoidal variations in the bias as the temperature of the combining optic mounted on the gyro frame is varied. It is the intent of this disclosure to provide a means to prevent the unwanted external scatter effects in the split-gain gyro and allow the operation of the device as an inertial grade rotation sensor.

SUMMARY OF THE INVENTION

The invention disclosed in this application is directed to an external scatter removal system for a ring laser gyroscope which includes an optical isolator. A semi-transparent output mirror of the ring laser gyroscope is secured to the gyroscope between the gyroscope frame and a combining optic device. The combining optic device may be a prism or other optical device. The output beams from the ring laser output mirror are forced to propagate in a coparallel manner by the combining optic, and can thus interfere with one another to create a modulated moving fringe pattern. This pattern (in the form of a modulated carrier signal) is detected by a pair of photo electric transducers, suitable for heterodyning multiple frequency optical signals, such as photodiodes. These signals are electronically processed to remove the carrier frequency from the modulation frequency and to determine the direction of movement of the pattern for rotation direction information. An optical isolator (in the form of a non-zero Verdet coefficient), such a Faraday device incorporated into the combining optic light path, can control the direction of the externally scattered light and prevent it from re-entering the cavity.

DETAILED DESCRIPTION OF THE PREFERRED EMBODIMENT

Figure 2:
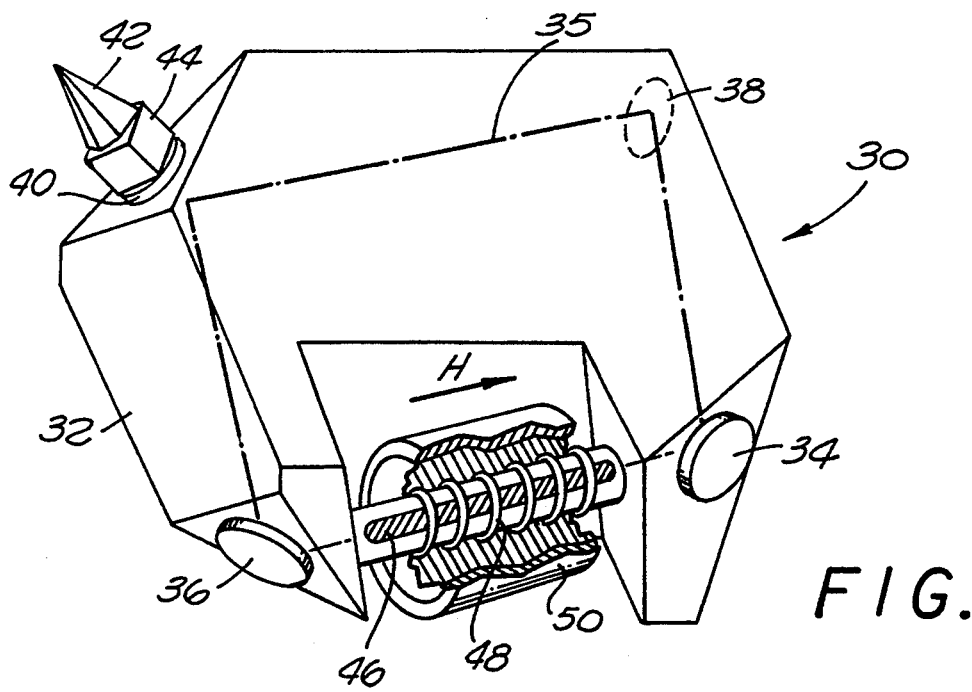
FIG. 2 is a perspective view of a preferred embodiment of the Split-Gain Multioscillator Ring Laser Gyroscope which includes the External Scatter Removal System which is the subject of this application.

With reference to FIG. 2, there is shown a Split Gain Ring Laser Multioscillator Gyroscope 30. The gyroscope is housed within a monolithic frame 32 and the optical pathway 35 is defined by the four corner mirrors, (34, 36, 38, and 40) configured in an out-of-plane manner. The active medium may be a helium-neon gas mixture that is activated by either D.C. or R.F. excitation (not shown). As is required for optimum split gain multioscillator operation, the active medium 46 is confined to one leg (here, between mirrors 34 and 36) of the gyroscope. The active medium 46 is restricted to the region within a magnetic field H, which may be generated by cylindrical or other shaped permanent magnets 50 and fine tuned by a field tuning coil 48. The output electromagnetic signals are detected at the output optics prism 42. The output optical signals are presented to the prism 42 through a semi-transparent mirror 40 and then into an optical isolator 44, which is the focus of the discussion of this invention.

Figure 3:
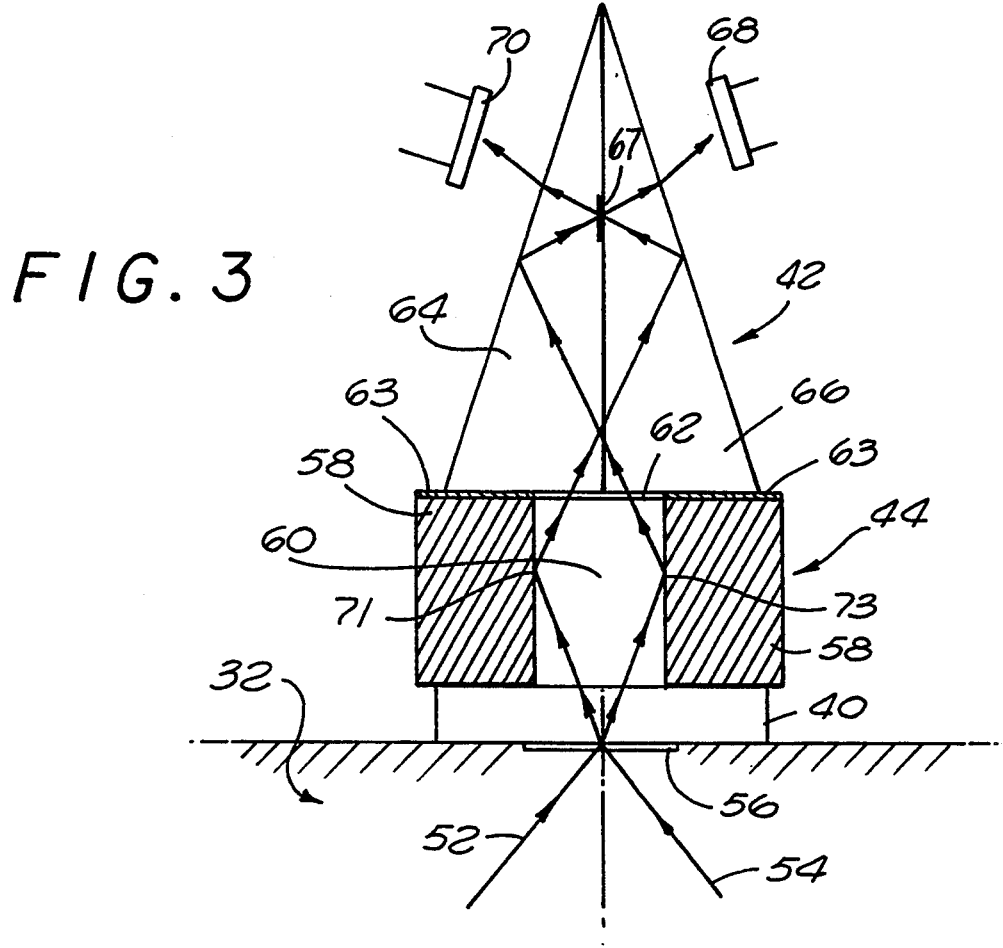
FIG. 3 is a cross-sectional view of a preferred embodiment of the Ring Laser Gyroscope External Scatter Removal System which is the subject of this application.
Figure 4A:
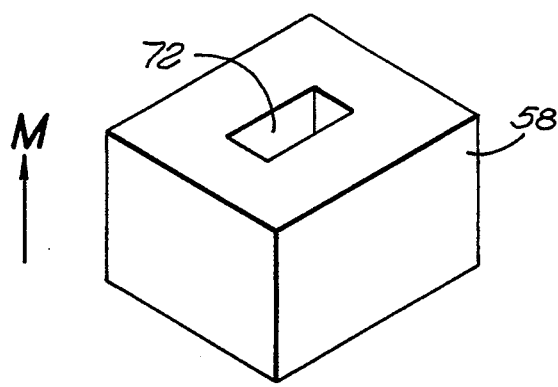
FIG. 4A is a perspective view of the output optics system permanent magnet 58 of the preferred embodiment of this invention.
Figure 4B:
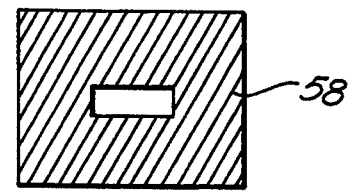
FIG. 4B is a top view of the output optics system permanent magnet 58 shown in FIG. 4A.
Figure 4C:
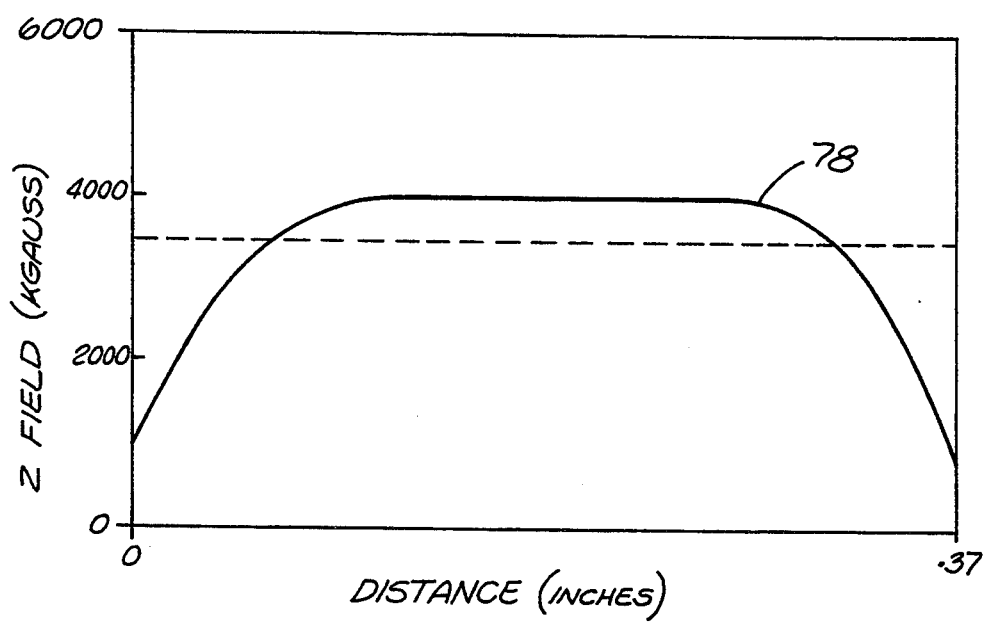
FIG. 4C is a graphic representation of the magnetic field strength generated by the permanent magnet 58 plotted against longitudinal distance.

FIG. 3 is directed to a preferred embodiment of the output optics detection system of this invention. A polarizing dielectric stack 56 is coated on the semi-transparent mirror substrate 40 mounted on the monolithic frame 32. Light beams 52 and 54, representing clockwise and anti-clockwise directions of rotation, counter propagate around the optical pathway 35 (FIG. 2) of the gyroscope 30 and enter the mirror substrate 40, passing through the polarizing coating 56 and traveling into the optical isolator 44. Light leaving the mirror substrate 40 first enters the totally internally reflecting crystal 60, which crystal is encased within a permanent magnet 58. The magnet may be made from Samarium Cobalt and produces a field on the order of 4000 gauss (See the graph of FIG. 4C of Magnetic Field plotted against distance and the curve 78 representative of the field of the magnet 58.). The crystal 60 preferably has a non-zero Verdet coefficient (such as a high Verdet coefficient) and may be made preferably from Terbium Gallium Garnett (TGG) crystal. Alternatively, the crystal may be made from other garnets such as Bismuth-substituted Gadolinium Iron Garnet (GBIG), Yttrium Iron Garnet (YIG), or Neodymium Gallium Oxide (NGG) with comparable performance results. The permanent magnet 58 is shown in perspective at FIGS. 4A and 4B and reveals a slot 72 for inserting the crystal 60 within the magnet 58 to insure emersion of the crystal 60 in the magnetic field M. The beams are totally internally reflected at points 71 and 73 of the crystal 60.

As the light beams 52 and 54 pass out from the crystal, they encounter a combined linear polarizer and quarter wave plate 62. The lower part of the combined polarizer and wave plate 62 acts as a linear polarizer and the top part acts as a quarter wave stack. The orientation of this linear polarizer relative to the polarization of the light exiting the mirror surfaces 56 is such as to give maximum isolation against light scattered from beyond the beamsplitter. The purpose of the quarter-wave plate portion of 62 is to change the polarization of the beams 52 and 54 so that they are not orthogonal at the combining optic prism 42 and are able to produce a fringe pattern at the detectors 68 and 70. For this reason the relative alignment of the axes of the linear polarizer and quarter-wave plate 62 are such that circularly polarized light is produced at the output. The quarter-wave plate assembly 62 may be mounted within a flat silica ring 63 with polished parallel faces in order to avoid any problem with the lack of parallelism in the plate assembly 62 producing non-colinear output beams at the detector. By mounting the ring 63, one also accommodates for any lack of parallelism between the heterodyned multiple frequency light beams 52 and 54. The light beams 52 and 54 then encounter the upright symmetric prisms 64 and 66 which together make up the combining prism 42. The light beams 52 and 54 are combined in the prism 42 with the assistance of the nominally 50%/50% beam splitter coated onto one of the prism half surfaces at 67. Light is then transmitted to the output optics detectors, such as the beat detectors 68 and the cavity length control detectors 70.

Figure 5A:
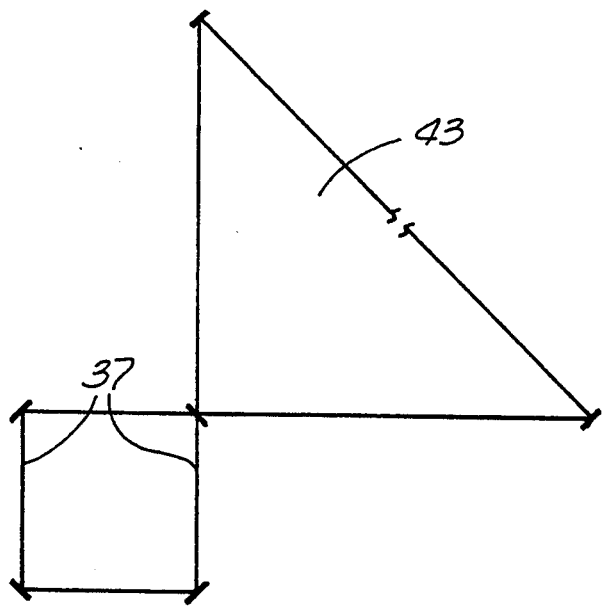
FIG. 5A is a schematic diagram of the relative positioning and size of a conventional multioscillator ring laser gyroscope with respect to the size of the external output optics detection system required to show the effects of external scatter in such conventional multioscillator ring laser gyroscope.
Figure 5B:
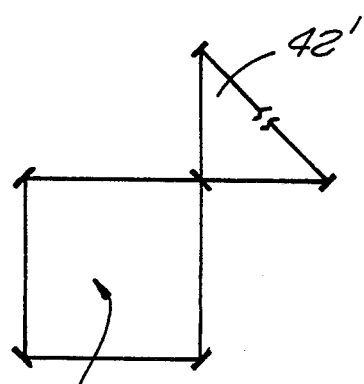
FIG. 5B is a schematic diagram of the relative positioning and size of the split gain multioscillator ring laser gyroscope of this invention with respect to the size of the external output optics detection system required to show the effects of external scatter in the split gain ring laser gyroscope.
Figure 5C:
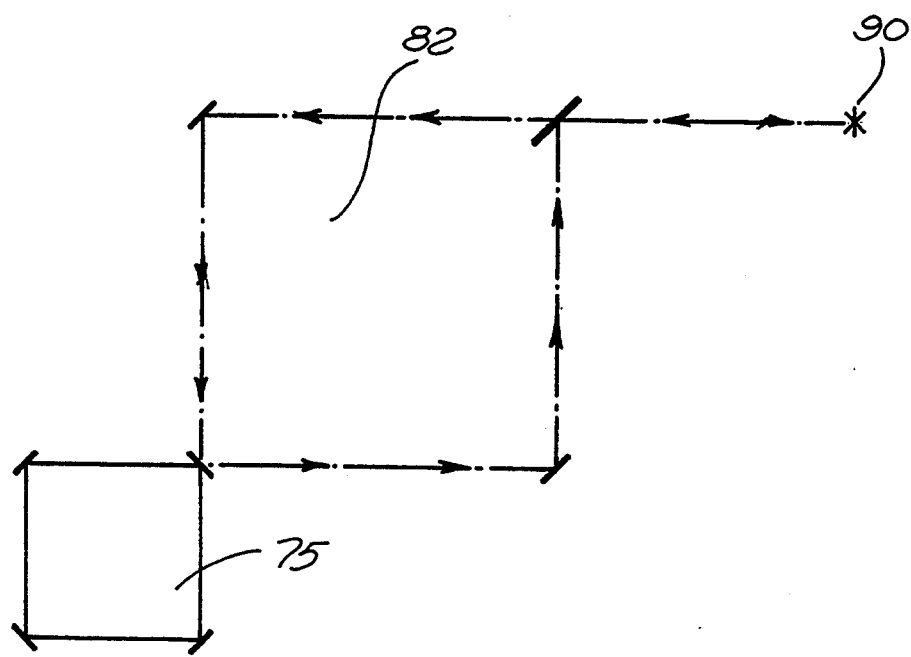
FIG. 5C is a diagram illustrating schematically the relative positioning of the ring laser gyroscope and external optics detection system showing how such a system produces re-injected scatter.

In operation, the optical isolator 44 acts to prevent light that is scattered from re-entering the optical pathway 35 (FIG. 2). FIGS. 5A, 5B, and 5C illustrate the need for such optical isolation. Tracing a particular ray of light (e.g. the clockwise beam) within the optical pathway 75 of a ring laser gyroscope, the light exits the optical pathway 75 and enters the beam combining pathway 82. As light travels along through the beam combining pathway 82, it encounters a beam splitter 84, which acts as a beam combining surface to combine this clockwise beam of light with an anti-clockwise beam, also propagating with the ring laser gyroscope. Light reflecting off the beamsplitter 84 travels on for detection at 90, but a small portion may be scattered from any surfaces or materials in the combined path beyond the beamsplitter. This scattered part travels back, passing through the beamsplitter into the pathway 82, and back into the optical pathway 75 of the ring laser gyroscope. This externally scattered part originating from the main clockwise beam of light in the cavity re-enters the optical pathway 75 of the gyroscope and continues to propagate in a clockwise manner but with a different phase shift the size of which depends both on the length of the external light path travelled by the beam and on its frequency. This 'forward' scattered beam becomes a component of the main beam and as such shifts slightly the lasing frequency of the clockwise beam. This frequency shift will in turn depend on the external light path length and will vary sinusoidally with a period equal to a change of one optical wavelength in the external path. Such a change will typically occur when the gyro frame undergoes a temperature change of 1° C. or so.

Similar effects will occur for all the clockwise and anticlockwise beams in the cavity and, if all the beam frequencies were the same, such frequency shifts induced by these externally scattered components would exactly cancel in the gyro output which is derived from the frequency difference between the beams. In the Faraday multioscillator the beam frequencies for the left-circularly polarized gyro pair are typically within a few MHz of one another as are the beam frequencies for the right circularly polarized beam pair. In order for the external scatter effects to be noticeable in an inertial grade gyroscope the external light path of the combining optics must be relatively large as is shown qualitatively in FIG. 5A in the beam path 43. For example in a typical Faraday multioscillator gyro the combined beam path would have to be of the order of meters in length before appreciable effects are seen when the scattered light re-enters pathway 37, whereas in practice the beam path is typically of the order of a few centimeters. However in contrast the beam frequencies for each gyro pair in the split-gain configuration may differ by several hundred MHz and the length of the external light path necessary in order to see serious effects on the bias from external scatter is correspondingly shorter as is shown qualitatively in FIG. 5B and the light path 42'. In fact in the absence of optical isolation a combining-optic light path of only a few centimeters, as occurs in practice, is enough to affect the performance of an inertial grade gyroscope when scattered light re-enters pathway 35.

Figure 1A:
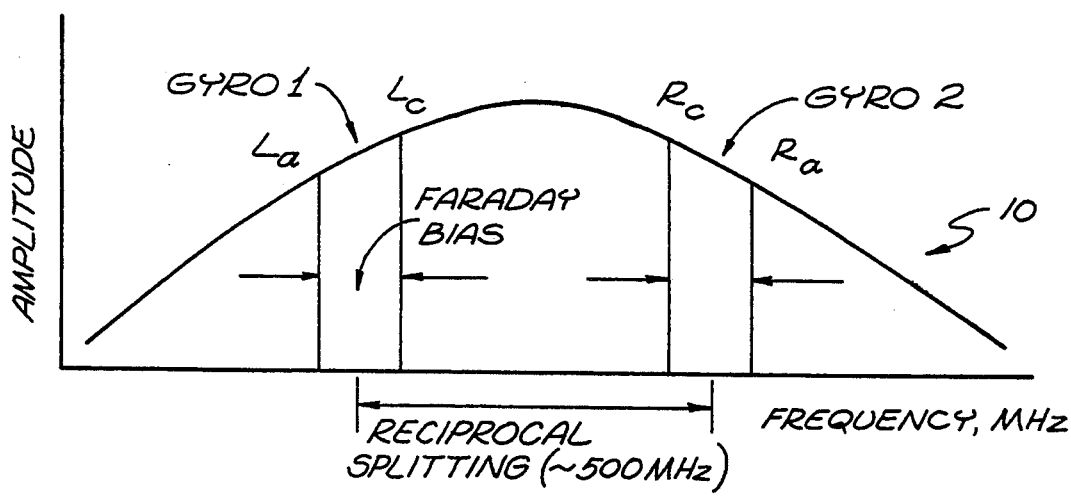
FIG. 1A is a PRIOR ART graphic representation of the Gain Profile curve for a non-planar multioscillator ring laser gyroscope, showing both reciprocal and Faraday splitting of the multimode resonant frequencies of the ring laser gyroscope.
Figure 1B:
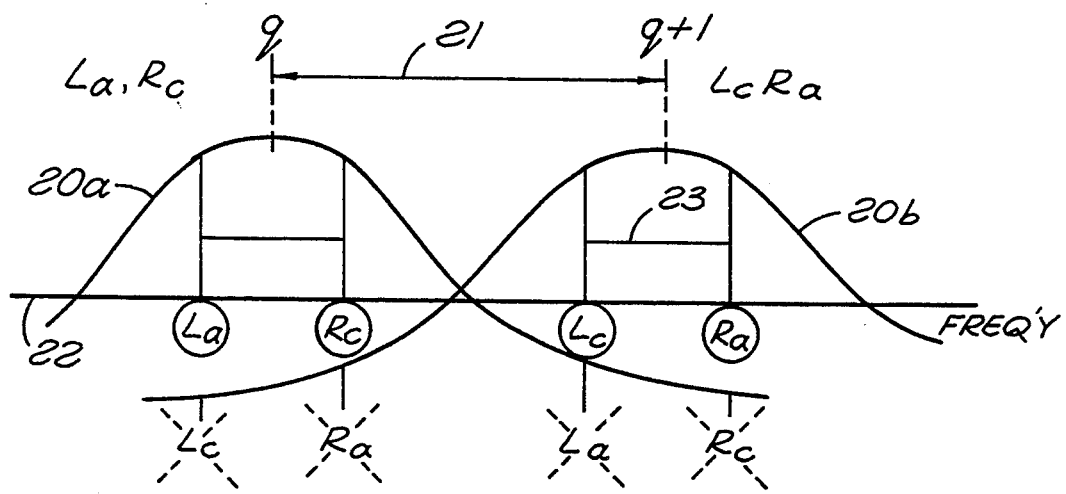
FIG. 1B is a PRIOR ART graphic representation of the Gain Profile curve for a non-planar Split-Gain Multioscillator Ring Laser Gyroscope, showing both the (q) and (q+1) longitudinal mode groups of the Split Gain Gyroscope, illustrating the mode suppression characteristic of a Split Gain Gyroscope.

As discussed in the Background of the Invention, the preferred and alternative embodiments of this invention prevent light signals that have already been processed by the beam combining optics from going back into the optical pathway of the ring laser gyroscope through the use of an optical isolation system. The disclosed embodiments of the optical isolation systems of this application are based on the Faraday effect which rotates the plane of a linearly polarized light beam as this beam propagates through a suitable material in the presence of an axial magnetic field. Faraday isolator schemes are well-known in the art and are used to prevent unwanted retroreflections returning into the cavity of linear lasers, particularly where high energies are concerned. Examples of classical Faraday Isolation schemes are taught in various articles and textbooks, including "*A Faraday Effect Optical Isolator*" by L. J. Aplet and J. W. Carson, APPLIED OPTICS, vol. 3 No. 4, April 1964, at pages 544–545; "*The Faraday Optical Isolator*" by G. Fisher, J. OPT. COMMUN., 8 (1987) 1, pp. 18–21; and, OPTICS, by E. Hecht and A. Zajac, §8.11.2, *The Faraday Effect*, pp. 261–263. A Faraday optical isolation scheme is used to isolate a passive ring laser gyroscope 10 from its laser source 12 (FIG. 1) in U.S. Pat. No. 4,923,299 issued to Dana Z. Anderson, et. al.

A Faraday isolator scheme can be used to overcome the external scatter problem in the split gain and Faraday multioscillator ring laser gyroscopes. A compact and relatively simple arrangement of Faraday material and magnets is disclosed which will provide isolation from all external-scatter effects in a general split gain multioscillator ring laser gyroscope configuration. Although not specifically disclosed in detail, it is suggested that the triaxial split-gain gyroscope design disclosed heretofore in another copending application (assigned to the same assignee of this application and entitled "TRIAXIAL SPLIT-GAIN RING LASER GYROSCOPE" by Graham J. Martin et. al. filed Aug. 13, 1990 as Ser. No. 07/570,839) may take advantage of the already existing axial magnetic field applied to the gain discharge for the operation of the split gain gyroscope triaxial embodiment for use in conjunction with a Faraday isolator for the external scatter removal system for ring laser gyroscopes of this disclosure. A different approach to this problem may be found in a co-pending application assigned to the same assignee as this application entitled "METHOD AND APPARATUS FOR REDUCING ROTATIONAL BIAS ERROR IN RING LASERS" (Attorney Docket No. 72-272 (GCD 87-38/88-20), Serial No. 07/619,703, filed Nov. 9, 1990. The Faraday effect can be used ideally to create a one-way light system and thus prevent scattered light returning through the optics. If a Faraday rotator is positioned to produce 45 degrees of polarization rotation, then the system can have essentially 100% throughput in the forward direction, while the throughput in the other direction will result in nearly complete isolation.

As taught in the above cited patent and articles, a Faraday glass or element, in the presence of an axial magnetic field, may be positioned to rotate the plane of polarization 45 degrees in a forward direction, and an additional 45 degrees when the same light passes back through the Faraday glass, for a total roundtrip rotation of 90 degrees. The net result of such rotation is that counterpropagating beams will then have orthogonal polarizations such that the forward propagation of light has total throughput, while the opposite propagation of light is blocked. When incorporated into the split gain gyroscope combining-optics system, the Faraday-optical isolator 44 (FIG. 3) must be positioned before the counterpropagating beams are combined in order to preclude all backscattered light. FIG. 3 shows how the external scatter removal system is implemented and that any such isolator must be positioned in the optical path to interdict both input beams for complete isolation from external scatter. In order to properly work in a split gain gyroscope environment, where the gyroscope active medium 46 (FIG. 2) requires its own magnetic field to operate, the optical isolator 44 combining-optics 42 should be placed on a mirror as far from the plasma region as possible (as is shown in FIG. 2). Another design requirement is that the isolator magnets 58 (FIG. 3) should be as small as possible so as to minimize any stray fields that may affect the field uniformity around the plasma region 46.

Figure 6A:
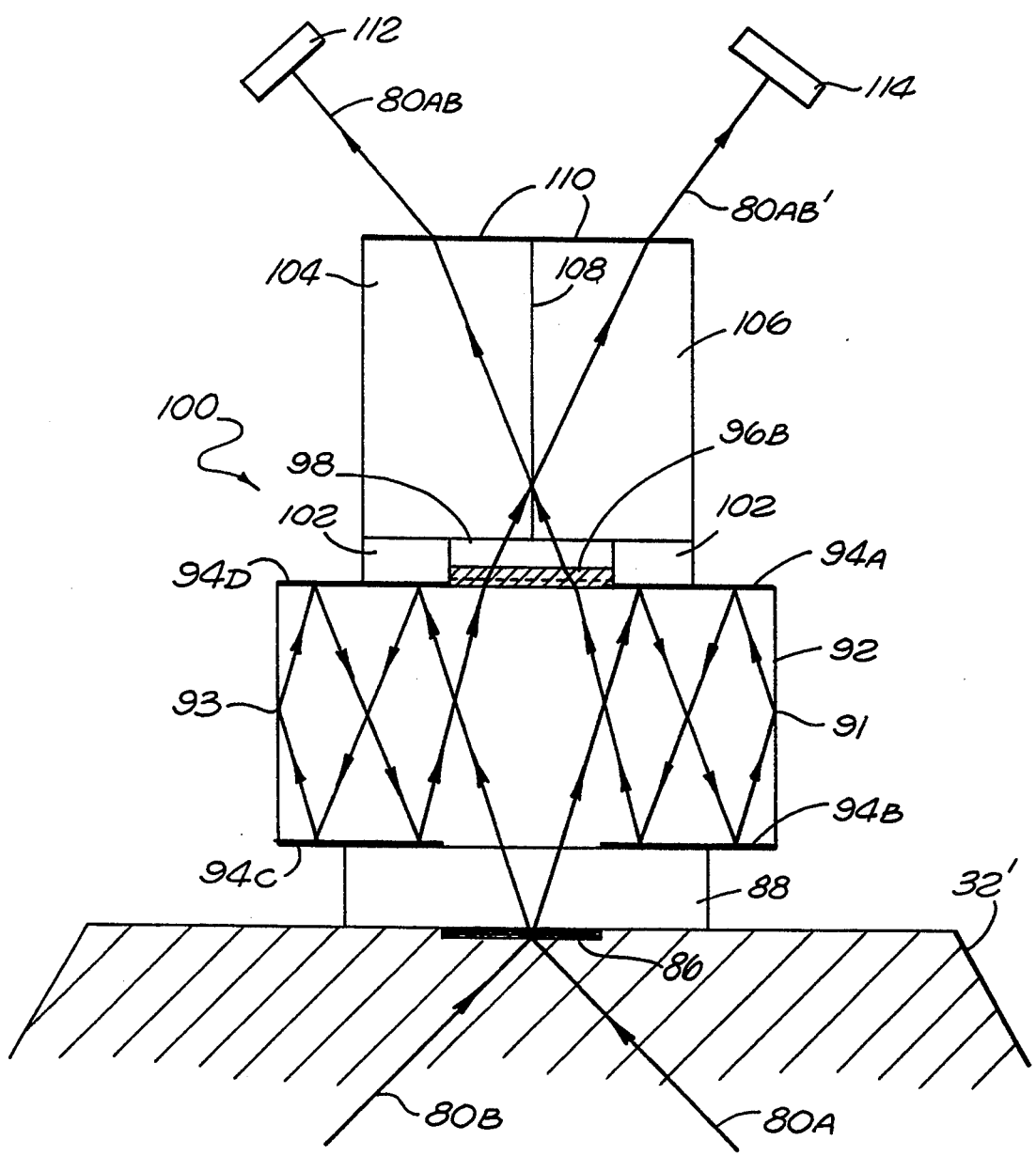
FIG. 6A is a cross-sectional view of an alternative embodiment of the Ring Laser Gyroscope External Scatter Removal System which is the subject of this application.
Figure 6B:
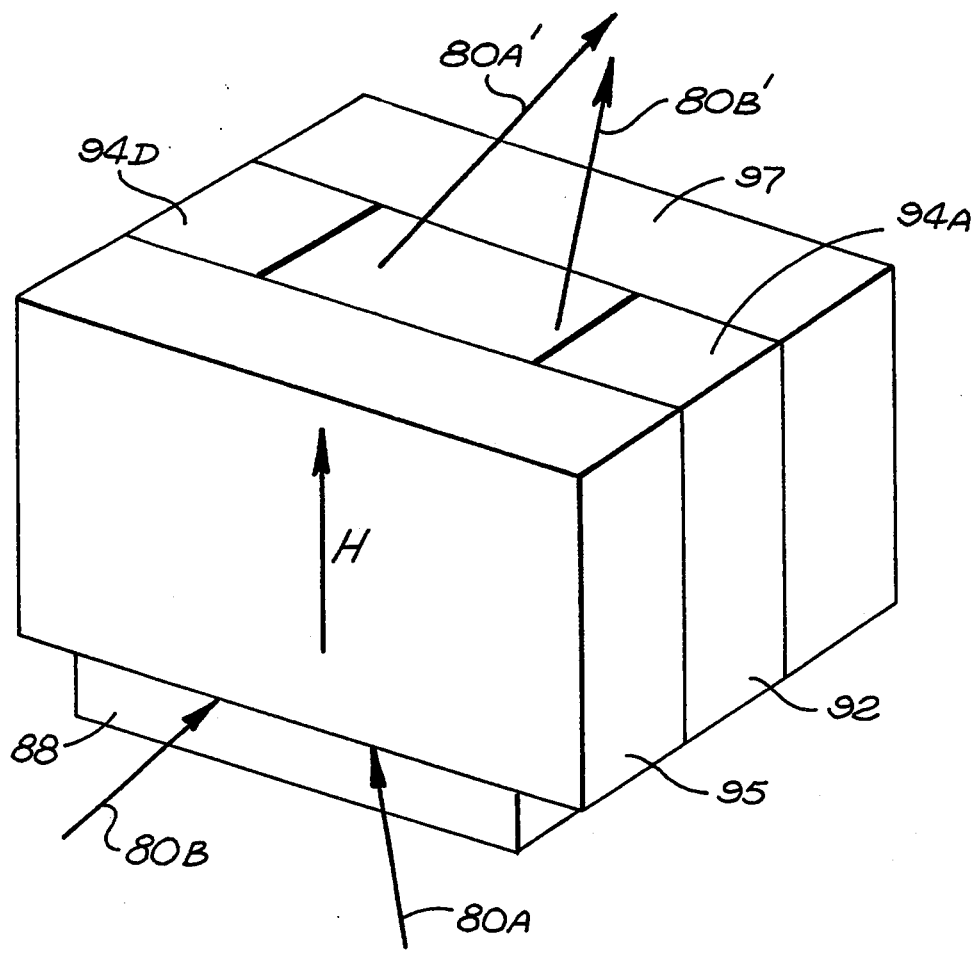
FIG. 6B is a perspective view of the light direction controlling system of the alternative embodiment of the invention shown in FIG. 6A.

With reference then to the alternative embodiment 100 of the external scatter removal system of this invention, as shown in FIGS. 6A and 6B, the counterpropagating beams (80B and 80A) exit the gyroscope frame 32' and pass through the mirror dielectric coating 86 (acting as a linear polarizer), continuing on through the substrate 88. Although the beams 80B and 80A are substantially circularly polarized inside the gyro cavity, the nature of the dielectric coating 86 in transmission and the angle of incidence on the coating will cause the beams (80A and 80B) to be substantially (98%) linearly polarized by the time they reach the mirror substrate 88.

The beams 80A and 80B then pass from the substrate 88 into the Faraday glass 92 (made from a glass material such as Hoya FR5) where they undergo a series of multiple reflections as shown. The surfaces 94A, 94B, 94C, and 94D of the Faraday glass 92 are coated with a 100% reflective coating. The beams 80A and 80B are totally internally reflected at the surfaces 91 and 93. The Faraday glass 92 is surrounded by two bar magnets 95 and 97 (shown in detail in FIG. 6B) which produce a magnetic field H (FIG. 6B). These bar magnets 95 and 97 create the necessary magnetic field H which will produce a Faraday rotation of approximately 45 degrees for each beam (80A and 80B) as they experience the multiple bounces. For an FR5 Faraday glass 92, the field may be of the order of 3000 to 4000 gauss field strength.

Both beams 80A' and 80B' next exit the Faraday glass 92 and pass into a combined optical polarizer and wave plate (the same arrangement as in the preferred embodiment) comprising a linear polarizer 96A and a quarter-wave plate 96B. The orientation of the linear polarizer 96A must be set properly if isolation is to be obtained. Since parallelism may a problem with the combined optical polarizer 96A and wave plate 96B assembly, this assembly may be mounted in a fused silica ring holder 102 as shown, leaving a gap 98 to accommodate the lack of parallelism. Parallelism of the order of half an arc minute for the entire isolator assembly is essential so that the two beams 80A' and 80B' are ultimately combined to form a detectable fringe pattern. The purpose of the quarter-wave plate 96B is to change the polarization of the beams 80A' and 80B' so that they are not orthogonal at the beam combining optics 104 and 106 and, thus, may be able to produce a fringe pattern at the heterodyne detectors 112 in a similar manner to the preferred embodiment. The beams (80A' and 80B') then pass into a beam combining optical block 104 which may have the conventional form of an upright prism or the cubic form 104 shown in the FIG. 6A. This combining optic system is made up of two pieces (104 and 106), of which one is coated with a 50%/50% beam splitter 108. At this point the beams (80A' and 80B') are combined to form two parts 80AB and 80AB' which exit the beam combining optics 104 and 106 through an antireflection coating 110. These output beams 80AB and 80AB' are directed respectively to heterodyne detectors 112 and intensity detectors 114.

It should be noted that the linear polarizer 96A is aligned so that any light passing backward along the beam paths of 80A and 80B through the polarizer 96A, the Faraday glass 92, the mirror substrate 88 and onto the mirror coating 86 is blocked at the mirror coating 86 which acts as a linear polarizer in transmission as mentioned earlier. Thus, if the Faraday glass 92 produces exactly 45 degrees of rotation, the linear polarizer 96A will be orientated to pass light at 45° to the normal to the reflection plane for beams 80A and 80B at the dielectric coating 86. Any deviation from 45° of rotation by the Faraday glass 92 can be compensated for by a slight correction in the orientation of the linear polarizer 96A. In an ideal isolator the Faraday material produces a rotation of 45 degrees in the impingent linearly-polarized beam. If the rotation is less than this then full isolation can still be obtained but the throughput of the device is appreciably less than 100%.

For instance the transmission of the isolator is given by, $$(\cos(90° - 2\omega))^2 = Transmission.$$

where $\omega$ is the rotation produced by the Faraday element. In a case when $\omega = 22.5°$, then, $$90° - 2\omega = 45°;$$

and the transmission at maximum extinction for backreflected light is $$\left(\frac{1}{\sqrt{2}}\right)^2 = 50\%$$

Unlike the case of an ideal isolator where the magnetic field can be arranged to give appreciably 45 degrees of Faraday rotation, the field for any triax split gain gyroscope isolator will probably smaller. It is not necessary to tune the rotation to 45 degrees and in the above configuration the actual rotation is likely to be around 25 degrees giving a throughput of about 60%, but close to complete isolation from backscattered light will still be achieved.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, any material exhibiting a high Verdet coefficient and good optical isolation in a Faraday optical isolator scheme would be useful to act as the optical isolator crystal 60 of FIG. 3 or the Faraday glass 92 of FIG. 6A of this disclosure. Also, while a Faraday isolator scheme and assembly of the disclosed invention may be preferably used in a split gain multioscillator ring laser gyroscope, the desired elimination of unwanted scatter may also be achieved by an acoustic frequency shifter, such as a surface acoustic wave device, to prevent phase shifted backscatter to re-enter the optical path from the beam combining optics. Thus, alternate embodiments having substantially equivalent functions or structures are intended to be comprehended within the scope of the appended claims.

What is claimed is:

1. An external retroscatter removal system for a ring laser gyroscopes, comprising:
   a semi-transparent output mirror of said ring laser gyroscope affixed to a frame of said gyroscope, said mirror allowing electromagnetic waves to pass therethrough;
   means for controlling the direction and polarization of said electromagnetic waves which propagate through said output mirror of said ring resonator cavity of said ring laser gyroscope, including a Faraday optoisolator positioned at an output side of said semi-transparent output mirror of said ring laser gyroscope;
   whereby, external scatter is controlled and restricted from propagating back into said ring resonator cavity of said ring laser gyroscope.

2. The external scatter removal system for a ring laser gyroscope of claim 1, further including a combining optics means for adjusting said electromagnetic waves so that said waves are made to be substantially co-linear at the output of said combining optics means;
   and, wherein said Faraday optoisolator positioned at an output side of said semi-transparent output mirror of said ring laser gyroscope is positioned between said combining optics means and said semi-transparent output mirror of said ring laser gyroscope.

3. The external scatter removal system for a ring laser gyroscope of claim 4, wherein said Faraday optoisolator for controlling the direction of wave electromagnetic propagation through said combining optics means, further includes:
   a polarizing dielectric stack positioned on said semi-transparent output mirror of said ring laser gyroscope;
   an optical crystal with a non-zero verdet coefficient positioned between said combining optics means and said semi-transparent output mirror;
   a permanent magnet In close proximity to said crystal, said permanent magnet providing a stable magnetic field to said crystal;
   and a second linear polarizer positioned between said crystal and said combining optics means.

4. The external scatter removal system for a ring laser gyroscope of claim 3, wherein said optical crystal is totally internally reflecting.

5. The external scatter removal system for a ring laser gyroscope of claim 3, wherein said second polarizer further includes:
   a quarterwave plate positioned upon said second polarizer between said polarizer and said combining optics means;
   a ring for accommodating any lack of parallelism in the second polarizer surfaces with respect to one another, said ring placed between said magnet and said combining optics means;
   whereby, said quarterwave plate is able to change the polarization of said heterodyned multiple frequency electromagnetic waves, so that these waves are not orthogonal at the combining optic means and may produce a fringe pattern detectable by a photodetector means.

6. The external scatter removal system for a ring laser gyroscope of claim 1, wherein said combining optics means includes:

a set of upright triangular prisms forming an upright symmetric prism;

said upright symmetric prism having a beam splitter coating positioned along a vertical line of symmetry between said triangular prisms.

7. The external scatter removal system for a ring laser gyroscope of claim 3, wherein said combining optics means includes:

a set of upright triangular prisms forming an upright symmetric prism;

said upright symmetric prism having a beam splitter coating positioned along a vertical line of symmetry between said triangular prisms.

8. The external scatter removal system for a ring laser gyroscope of claim 3, wherein said may be made from a material selected from the group consisting of Terbium Gallium Garnett (TGG) crystal, Bismuth-substituted Gadolinium Iron Garnet (BGIG), Yttrium Iron Garnet (YIG), and Neodymium Gallium Oxide (NGG).

9. The external scatter removal system for a ring laser gyroscope of claim 2, wherein said Faraday optoisolator for controlling the direction of electromagnetic wave propagation through said combining optics means, further includes:

a dielectric coating, providing a first polarizing surface, positioned between said semi-transparent output mirror and said frame of said ring laser gyroscope;

a Faraday glass block having a plurality of totally reflective surfaces, providing multiple bounces of said multiple frequency electromagnetic waves within said glass block;

at least one magnetic source element providing a stable magnetic field to said glass block;

and a linear polarizer, providing a second polarizing surface, positioned between said glass block and said combining optics means.

10. The external scatter removal system for a ring laser gyroscope of claim 9, wherein said linear polarizer further includes:

a quarterwave plate positioned upon said linear polarizer between said polarizer and said combining optics means; and, a ring for accommodating any lack of parallelism in the second linear polarizer surfaces with respect to one another, said ring placed between said optoisolator and said combining optics means;

whereby, said quarterwave plate is able to change the polarization of said heterodyned multiple frequency electromagnetic waves, so that these waves are not orthogonal at the combining optic means and may produce a fringe pattern detectable by a photodetector means.

11. The external scatter removal system for a ring laser gyroscope of claim 9, wherein said combining optics means includes:

at least a set of rectangular beam combining blocks forming a single symmetric beam combining prism;

said symmetric beam combining prism having a beam splitter coating positioned along a vertical line of symmetry between said rectangular beam combining blocks; and, said symmetric beam combining prism having an anti-reflective coating positioned along a top surface of said rectangular beam combining blocks;

whereby, said heterodyned multiple frequency electromagnetic waves may be received by an appropriate detector with minimal signal noise or error.

12. A method of manufacturing an external scatter removal system for a ring laser gyroscope comprising the steps of:

coating a polarizing dielectric stack positioned on one surface of a semi-transparent output mirror of said ring laser gyroscope;

affixing said semi-transparent output mirror to the frame of said ring laser gyroscope;

coating a second polarizer onto a surface between an optoisolator and a combining optics prism;

positioning and securing said optoisolator between said combining optics prism and said semi-transparent output mirror of said ring laser gyroscope;

securing said combining optics prism to said output mirror of said ring laser gyroscope frame;

securing a permanent magnet in proximity to said optoisolator, said magnet having a stable axial magnetic field.

13. The method of manufacturing an external scatter removal system for a ring laser gyroscope of claim 12, further including:

positioning and securing a totally internally reflecting acting as the Faraday optoisolator, said crystal being secured between said combining optics prism and said semi-transparent output mirror of said ring laser gyroscope.

* * * * *